Oct. 10, 1961 W. W. MEYER 3,003,796
SHAFT SEAL
Filed Nov. 6, 1959 2 Sheets-Sheet 1

INVENTOR.
WALTER W. MEYER
BY
Barlow & Barlow
ATTORNEYS

INVENTOR.
WALTER W. MEYER
BY
*Barlow & Barlow*
ATTORNEYS

United States Patent Office 3,003,796
Patented Oct. 10, 1961

3,003,796
SHAFT SEAL
Walter W. Meyer, Warwick, R.I., assignor to Sealol
Corp., a corporation of Delaware
Filed Nov. 6, 1959, Ser. No. 851,322
1 Claim. (Cl. 286—11.15)

This invention relates to a shaft seal to prevent fluid from escaping along a shaft where it extends outwardly from a housing so as to be driven by some motor means.

In some seals, such as those that are driven through a helical spring from a shaft, it is required that the shaft always be rotated in the same direction in order for the spring to act as the rotary transmitting means to the rotary member of the seal. In some cases, such for instance as in certain pumps, they will operate regardless of the direction of rotation which is imparted to their drive shaft, and in such an instance it is desirable to provide a seal which will cause a seal between two rotary members whether the drive shaft be rotated clockwise or counterclockwise.

Accordingly, one of the objects of this invention is to provide a seal which may effectively operate whether the shaft is rotating in a clockwise direction or in a counterclockwise direction.

In some cases some elastomer is desirable to grip the shaft in order for a drive to be imparted to the rotary member of the seal and yet it is desired that this rotary member also move axially, but where a gripping sufficient to impart a drive is had, an axial movement is constrained.

Accordingly, an object of this invention is to provide an arrangement which will permit of free axial movement without in any way being constrained by the imparting of a rotary movement to the rotary member which it is desired shall be axially moved.

Another object of this invention is to provide a centering ring for the rotary sealing member and to form this ring of a material which will serve to insulate any heat in the rotary sealing member from being transferred to an elastomer for sealing this ring to the shaft.

With these and other objects in view, the invention consists of certain novel features of construction as will be more fully described and particularly pointed out in the appended claims.

Figure 1:
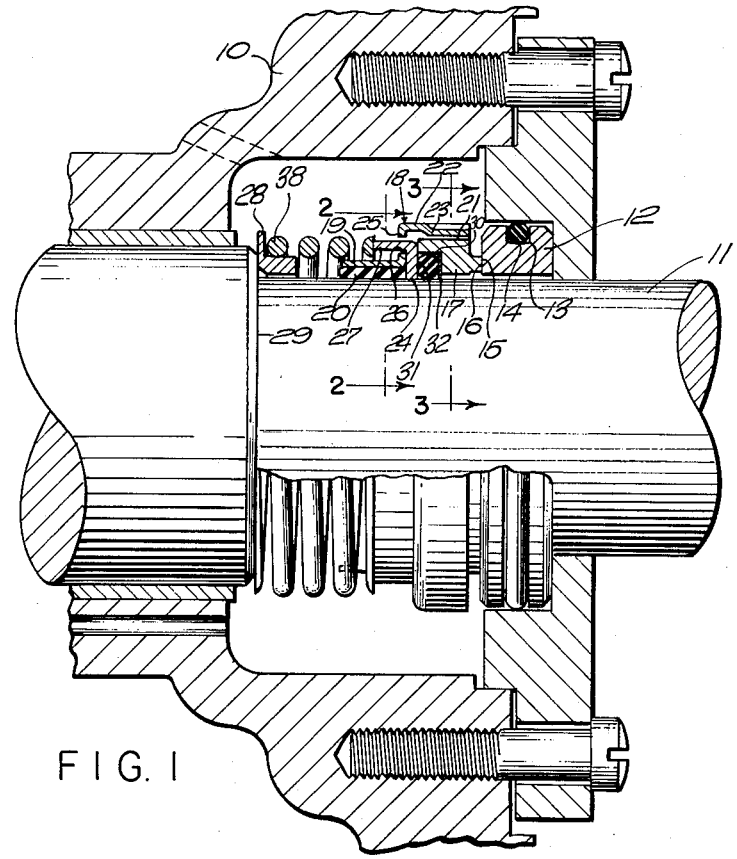
FIGURE 1 is a sectional view showing a portion of a pump housing and a shaft extending therefrom and illustrating my seal as applied between this pump housing and its shaft.

In carrying out this invention, I have provided a sleeve having an elastomer bonded to its inner surface, which elastomer is of such a size as to grip sufficiently tightly to provide a driving relation between the sleeve and the shaft, and I then positively provide a driving connection between this sleeve and the rotary sealing member so that all rotary movements of this rotary sealing member is provided through this sleeve. The interlocking connection with the sleeve is such as to permit axial movement of the rotary sealing member and then I provide a resilient pressure on this rotary sealing member by transmitting such pressure through the sleeve in such a way that the axial pressure is not influenced in any way by the torque transmitted to this sleeve, there being an opening or passage through the sleeve of a size sufficient for the free transmission of such pressure.

With reference to the drawings, 10 designates generally a housing with a shaft 11 extending therefrom which is to be driven by some motor for operating the pump within the housing. The pump here illustrated is one which may be rotated in either direction so that the shaft may move clockwise or counterclockwise as choice may dictate. One of the sealing faces will be fixed or stationary and the other sealing face rotated with the shaft. In the illustration I have shown a member 12 which is to be held in non-rotative relation to the housing having a recess 13 and an elastomer 14 for holding it in sealed relation to the housing. It is provided with an annular sealing face 15 to mate with an annular sealing face 16 provided on the rotary member 17 and between which members the seal is provided. The member 12 may be of a hardened steel, while the member 17 may be of carbon.

A sleeve 18 has a cylindrical portion 19 of a size a little larger than the shaft 11, and on the inner face of the cylindrical portion 19 I have bonded an elastomer 20 which is of such a size that when forced on to the shaft 11, it will provide a friction driving fit with this shaft 11, and as the elastomer is bonded to the inner surface of the cylindrical part 19, it will not flow due to the interference fit on the shaft. Thus, this sleeve 18 is secured to the shaft so as to be driven by the shaft as the shaft rotates. This sleeve is not called upon to move axially nor will it move relative to the shaft rotatably because of this gripping connection by the elastomer 20. This elastomer 20 may be a continuous annulus about the shaft or it may be in the form of sections spaced from one another, its function being to bind the sleeve to the shaft so that the sleeve will rotate with the shaft.

The rotary sealing member 17 is provided with a plurality of notches here shown as three in number designated 21 in its periphery and extending axially throughout the axial extent or thickness of its rotary member. The portion 22 of this sleeve extends toward the sealing face sufficiently to embrace this sealing member and has portions of its stock at 23 deflected into the notches 21 so that as rotation of the sleeve occurs, there will be engagement of these deflected portions with the side walls of the notches so as to drive the sealing member 17 in rotary fashion, and yet this sealing member is free to move axially because these deflected portions do not grip the bottom walls of the notches 21.

Figures 2, 3:
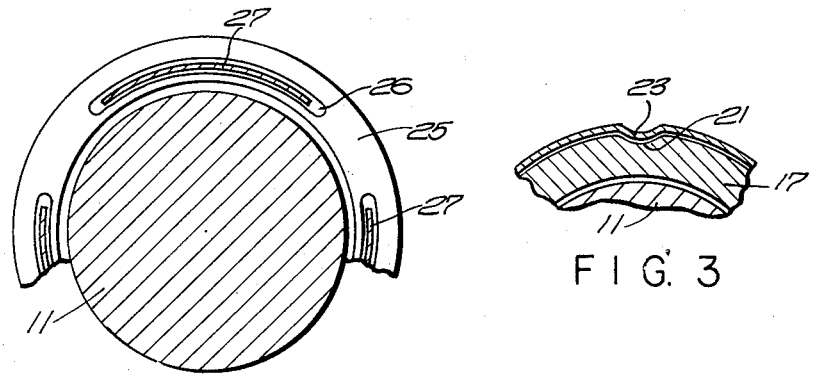
FIGURE 2 is a sectional view on line 2—2 of FIG. 1.
FIGURE 3 is a sectional view on line 3—3 of FIG. 1.
Figure 5:
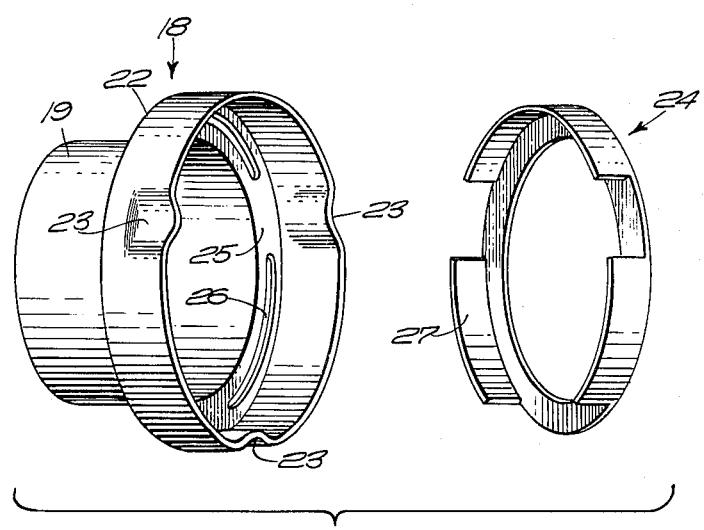
FIGURE 5 is an exploded perspective view of two interfitting parts of the assembly.

The sealing member 17 is moved axially by a pressure transmitting member 24 which is of a shape to encircle the shaft and engages the end wall or end of the rotary sealing member 17 and is located between the end of this rotary sealing member 17 and the radial portion 25 of the sleeve which radial portion is provided with a plurality of openings 26 of a size to permit free passage of the arcuate projections 27 carried by the pressure transmitting member 24 as shown in FIGS. 1, 2 and 5. A spring 33 which embraces a shaft 11 acts against these projections 27 and is compressed between them and the washer 28 abutting against the shoulder 29 of the shaft so as to maintain a constant axial pressure through the member 24 on to the rotary sealing member 17 forcing its face 16 against the face 15.

In some cases instead of providing projections such as 27, pins may be utilized to be carried by the washer 24 to freely protrude through openings of a shape corresponding to the cross-section of the pins for the transmission of the pressure of the spring through the sleeve 18.

This rotary sealing member 17 is recessed as at 30 at its edge remote from its sealing face 16 and located in this recess there is an elastomer 31 which engages a washer 32 on the side of this recess nearest the sealing face. This elastomer 31 of O-ring type extends circularly about the shaft and provides a seal to prevent the passage of fluid between the shaft and this rotary seal 17. This elastomer is of a size so as to engage all four walls or that is the wall of the recess radially outward, the shaft opposite it, the washer 24 which closes the recess 30, and the washer 32 on the forward side of the recess. From the standpoint of sealing this washer 32 need not be present, but from another standpoint this washer is exceedingly desirable.

The washer 32 is formed of a non-metallic material and is of a size to form a close clearance centering fit on the shaft 11 and in the recess 30 so that it forms a centering device for the rotary sealing member 17 on the shaft causing it to always have the same position of engagement with the sealing face 15, and as the material of this washer is non-metallic and of a type which is resistant to the passage of heat, it also serves to protect the elastomer 31 from the heat which is generated in the rotary sealing member by reason of its frictioning the sealing face as it rotates. Although this elastomer 31 provides a seal it being confined as it is between four walls moves with the rotary sealing member 17 as this member is moved axially under influence of the spring.

From the above, it will be apparent that I have provided a means for rotating one of the sealing members by a positive means and yet let this sealing member free to be moved axially, and I have transmitted spring pressure axially of the shaft through this rotary driving means without the torque of the rotary driving means being communicated to the means for urging the rotary sealing member axially into sealing position.

Figure 4:
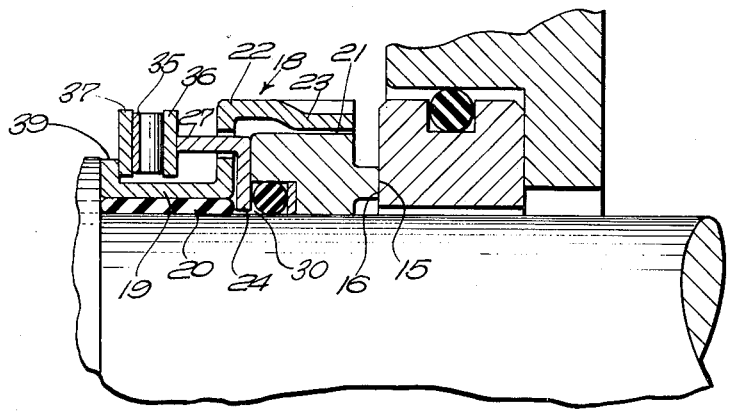
FIGURE 4 is a view similar to FIG. 1 but showing a modified form of spring being used and my seal existing as a unit of assembled parts.

In some cases as shown in FIG. 4 instead of using a helical spring as at 38 above described, I may use a wavy type washer spring 35 between two washers 36 and 37 for urging the flanges 27 and washer 24 toward the sealing faces 15 and 16, and when a spring of this type is used, it will be of a much shorter axial dimension and I may roll the cylindrical part 19 outwardly as at 39 so as to hold the washers and spring in assembled relation with the remainder of the seal providing a unit which may be handled as a complete part rather than several separate parts such as would be the situation in connection with the showing of FIG. 1.

I claim:

A rotary shaft seal for relative rotation in either direction clockwise or counterclockwise about the shaft axis comprising a relatively fixed member having an annular sealing face, and a relative rotary member having an annular sealing face to mate therewith at one end thereof and a recess opening radially inward from the other end thereof, a sleeve for encircling the rotating shaft and having bonded to its inner surface an elastomer of a size to grip the rotating shaft to provide a driving connection therewith, said sleeve having an enlarged portion joined thereto by a radially extending portion, said enlarged portion having a connection to the rotary member to permit axial movement and provide a driving connection from said sleeve to said member, an elastic member located in said recess sealing the rotary member to the shaft, said sleeve having a radially extending portion with openings therein, a spring to exert axial pressure, a ring-like member having means passing freely through said openings for transmitting axial pressure from said spring to said rotary member, said ring-like member bearing against the rotary member adjacent the recess and maintaining the elastic member in said recess.

References Cited in the file of this patent

UNITED STATES PATENTS

| | | |
|---|---|---|
| 2,556,393 | Holben | June 12, 1951 |
| 2,585,154 | Montgomery | Feb. 12, 1952 |